Figure 1:
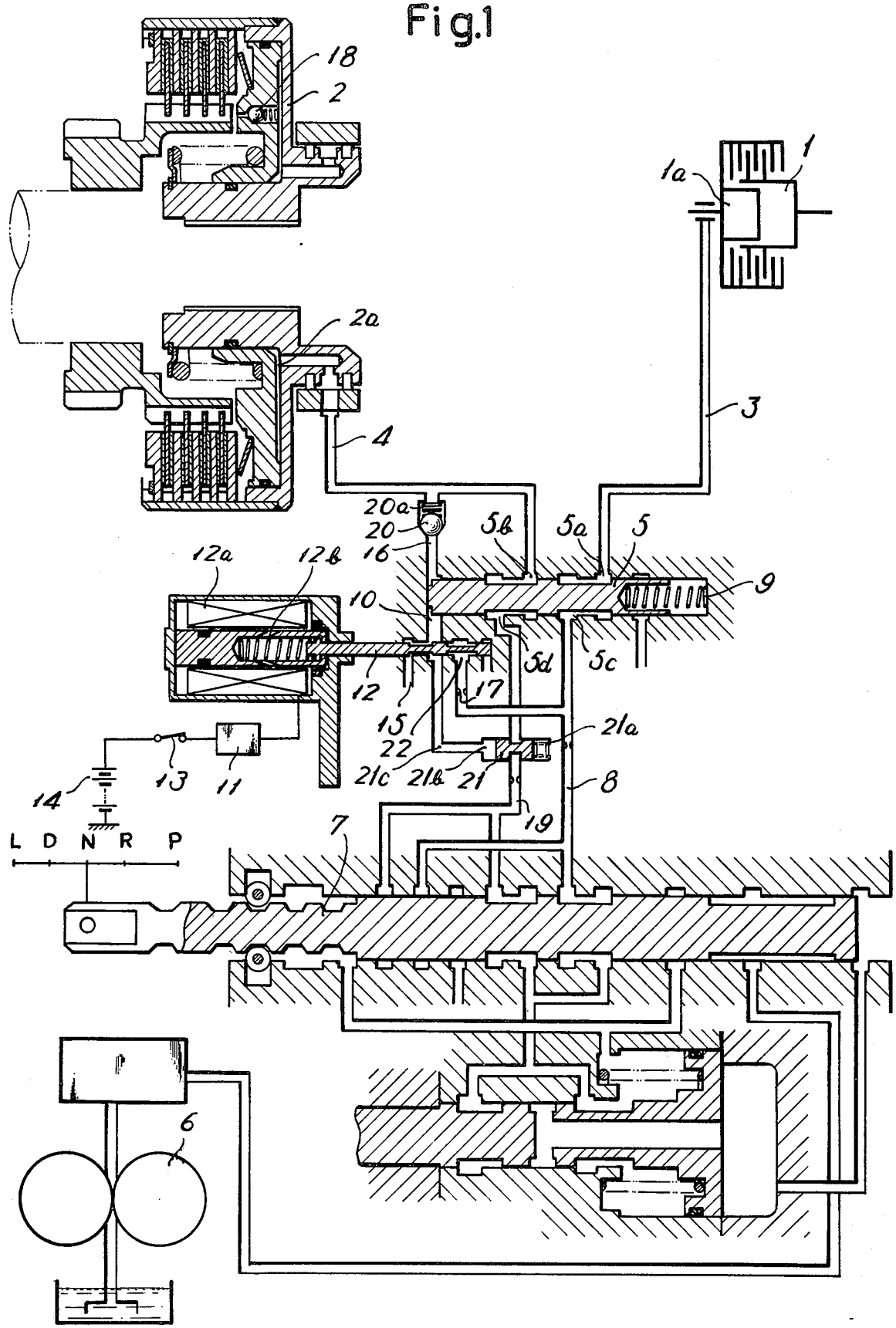

United States Patent [19]

Hattori et al.

[11] 4,049,101

[45] Sept. 20, 1977

[54] APPARATUS FOR PREVENTING FAULTY OPERATION IN TRANSMISSION OF MOTORCARS

[75] Inventors: Torao Hattori, Wako; Masakazu Maezono, Niiza, both of Japan

[73] Assignee: Honda Giken Kogyo Kabushiki Kaisha, Tokyo, Japan

[21] Appl. No.: 673,890

[22] Filed: Apr. 5, 1976

[30] Foreign Application Priority Data

Apr. 8, 1975 Japan .................................. 50-41777

[51] Int. Cl.² ............................................. F16D 25/10
[52] U.S. Cl. .............................. 192/87.19; 192/103 F; 74/364; 137/625.64
[58] Field of Search .................. 192/87.18, 87.19, 3.58, 192/103 F, 109 F, 85 A, 85 AA

[56] References Cited

U.S. PATENT DOCUMENTS

| 2,929,478 | 3/1960 | Tuck et al. | 192/87.12 |
| 3,808,738 | 5/1974 | Siebers et al. | 192/3.58 X |
| 3,823,621 | 7/1974 | Kubo et al. | 192/103 F |

*Primary Examiner*—Benjamin W. Wyche

[57] ABSTRACT

Apparatus for preventing faulty operation in automatic transmissions of motorcars, the transmission having a speed-change sensor and a shift valve therein, for controlling the operation of the latter, the apparatus comprising oil-pressure operated high-speed and low-speed clutches interposed in respective high-speed and low-speed systems of the transmission, the system being selectively connectable through the shift valve to a main line pressure circuit connected to an oil-pressure source, wherein the shift valve is operable by the oil pressure and has at one end an oil-pressure chamber connectable to the main circuit through a pilot valve that can be opened by operation of the sensor. The oil-pressure chamber is connected to the low-speed clutch through a by-pass, and a flow passage is connected between the chamber and the main circuit, provided with a restrictor therein, while the low-speed clutch is provided with a leak valve that is opened for discharging the oil pressure when the low-speed clutch is operated at a speed higher than a predetermined value. Preferably the apparatus comprises a manually operable valve for appropriate selective operation in one of a plurality of operational modes of the transmission. One or more check valves may be associated with the manually operable valve.

3 Claims, 3 Drawing Figures

APPARATUS FOR PREVENTING FAULTY OPERATION IN TRANSMISSION OF MOTORCARS

The invention relates to an apparatus for preventing faulty operation of the shift valve in an automatic transmission, as generally used for motorcars.

The applicants have previously proposed an arrangement according to which, in a transmission of this kind, the shift valve constructed for oil-pressure operation, serving to interchangeably, selectively connects either a high-speed clutch or a low-speed clutch to a line pressure circuit. The shift valve has at one end an oil-pressure chamber connected to a main line pressure circuit through a pilot valve which is operative in response to a speed-change sensor.

There is, however, a danger with this type of arrangement that, when a vehicle or motor car is being operated at high speeds, the shift valve being in the high-speed position, if an accidental signal is generated by the sensor, the shift valve would be automatically changed over to the low-speed side, thereby affecting a sudden engine braking action.

It is one of the objects of the present invention to provide an apparatus that is free from the foregoing defects.

In accordance with important features of the invention, an arrangement is provided of the type in which an oil-pressure operated high-speed clutch is used in a high-speed system, while a similar low-speed clutch is interposed in a low-speed system, interchangeably connected through a shift valve to a line pressure circuit leading to an oil pressure source such as a pump and the like.

The invention is mainly characterized in that the shift valve is constructed to be oil-pressure operated rather than being electromagnetic. At one end it has an oil-pressure chamber connected to the line pressure circuit through a pilot valve, arranged to open by the operation of the time sensor.

According to further, important features of the invention, the oil-pressure chamber is connected to the low-speed clutch through a by-pass. A flow passage, connecting between the oil-pressure chamber and the line pressure circuit, is provided with a throttle or restrictor interposed therein, and the same low-speed clutch is also provided with a leak valve that is opened when that clutch is rotated at a speed higher than a predetermined value, for discharging the interior oil pressure.

The applicants have previously proposed another arranngement according to which, in this kind of transmission, a subsidiary line pressure circuit is provided in parallel with the main pressure circuit, so that when a manual valve forming part of the system is changed over, for example to its "low" mode of operation, the low-speed clutch can be supplied with oil pressure through the subsidiary circuit, whereby a low-speed running of the vehicle can be ensured.

When this last-mentioned arrangement is combined with the foregoing, drawbacks are liable to result. It is therefore a further object of this invention to provide an apparatus which eliminates these possible additional drawbacks.

Thus, according to further, important features of the invention, a subsidiary line pressure circuit is provided which is ordinarily connected to the low-speed clutch, provided on one side of the main line pressure circuit, and so constructed that the subsidiary circuit can be connected to the oil-pressure source in place of the main circuit, when the manual valve is in its low position.

The earlier-mentioned by-pass has a check valve interposed therein, and the subsidiary circuit is also provided with a check valve, the same being closed when the pressure in the chamber is increased.

Figure 2:
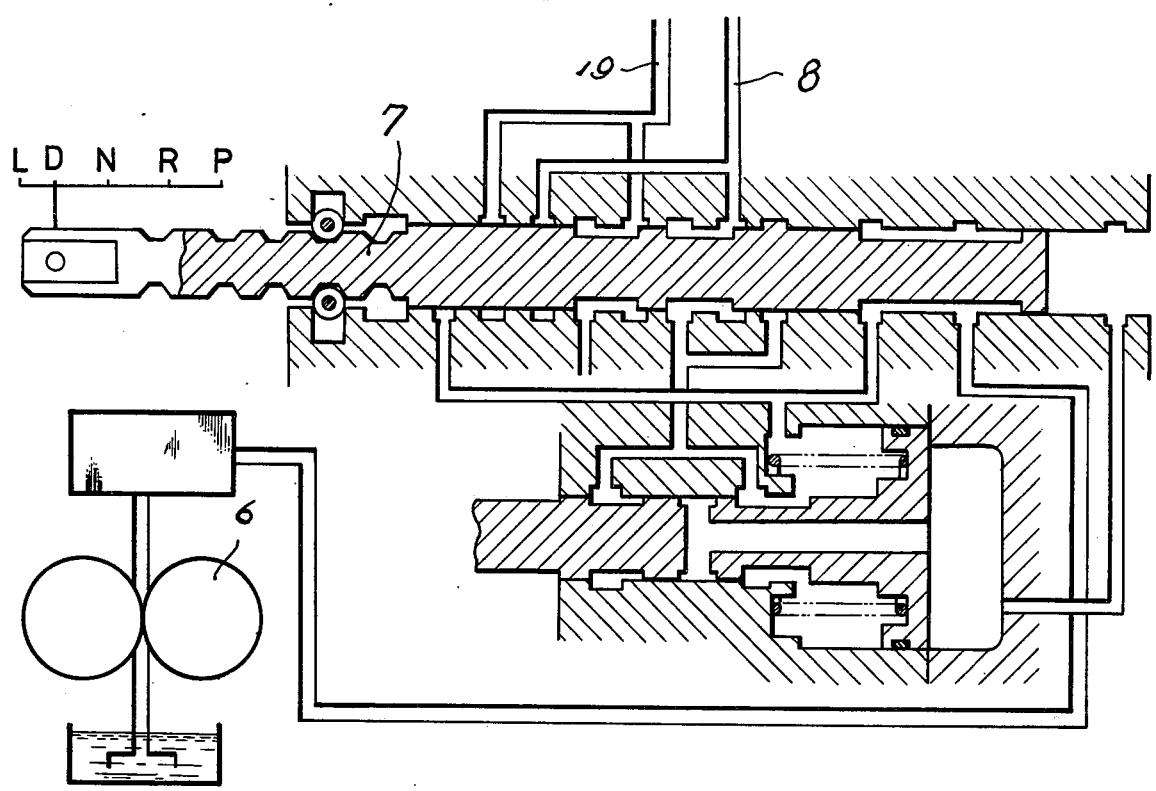
Figure 3:
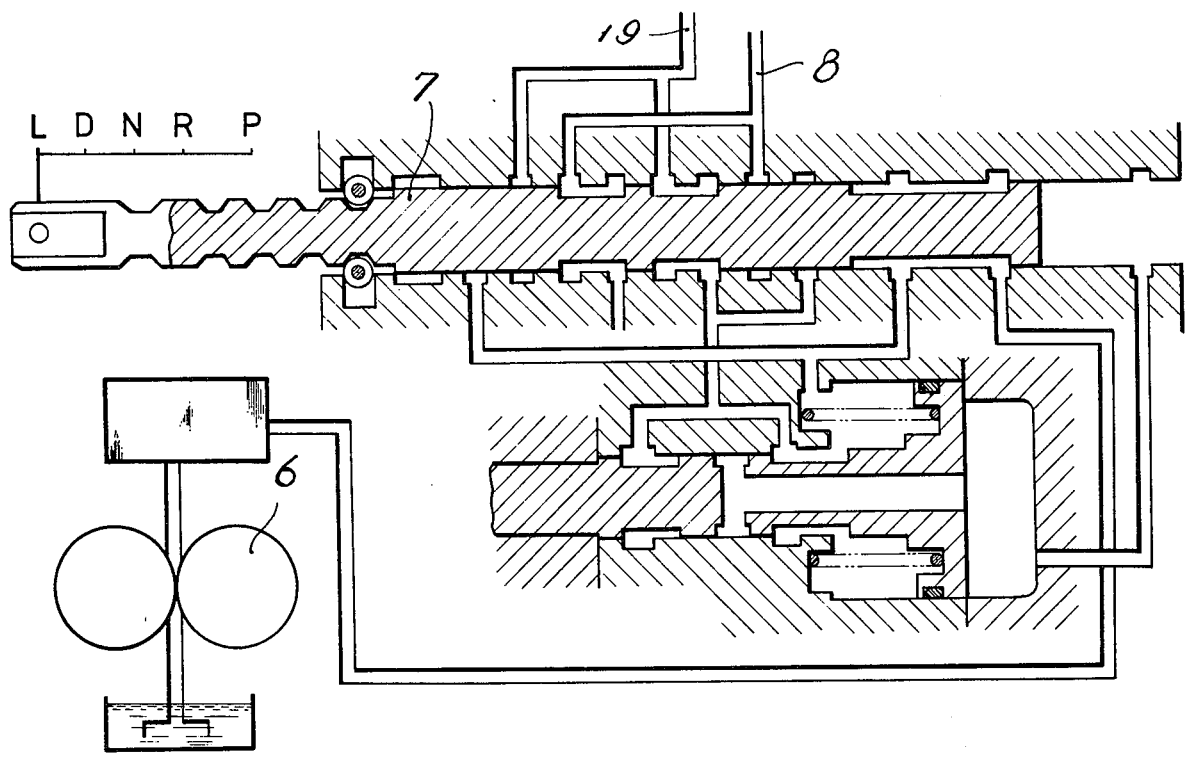

The invention will be better understood by reference to the following description when considered in conjunction with the accompanying drawings, wherein:

FIG. 1 shows a preferred exemplary embodiment of the inventive apparatus, and associated manual valve being in the "N" (neutral) position; and FIGS. 2 and 3 show the manual valve portion of the arrangement on an enlarged scale, respectively set to the "D" (drive) and "L" (low) positions.

In the figures, numeral 1 denotes an oil-pressure operated high-speed clutch as conventionally used in a high-speed transmission system while 2 identifies a similar but low-speed clutch incorporated in a corresponding low-speed system. Numerals 1a, 2a identify the respective oil-pressure chambers formed inside the respective clutches. The latter are in communication, through respective flow passages 3, 4 connected thereto, with a pair of right-hand and left-hand outlet openings 5a, 5b provided on one side of a shift valve 5, and the latter itself is in communication at one of its inlet openings, identified by numeral 5c, on the other side thereof, with a main line pressure circuit 8 that is connected through a manual valve 7 to an oil-pressure source 3, such as an oil-pressure pump, as shown. The valve 5 has a second inlet, 5d, which will be described somewhat later. Also, the manually operable valve, further correlations and arrangements, will be explained further down.

The valve 5 is so constructed that it can be switched from a high-speed position to a low-speed position, moving the same toward the respective left-hand and right-hand sides of the drawing. The former is the position where the oil-pressure chamber 1a is energized, and in the latter, it is the chamber 2a that receives oil pressure. FIG. 1 shows the valve 9 moved toward the left-hand side, by means of a conventional spring 9, for connection of the high-speed oil pressure chamber 1a. It will be noted that the provision of the spring 9 will ordinarily move the valve 5 towards the left-hand side, as shown, to be in the high-speed position.

An oil-pressure chamber 10 is provided at the left-hand end of the valve 5, and the same is connected by way of a flow passage 22 to the main line pressure circuit 8 through a pilot valve 12 that is responsive to a speed-change time sensor 11. By the operation of the latter, the valve is opened for supplying the line pressure to the chamber 10, and consequently the valve 5 is pushed toward the right-hand side, performing a change-over movement from the ordinarily assumed high-speed to the low-speed position.

The pilot valve 12 is constructed at an electromagnetic valve having on its outer periphery an operating solenoid 12a, the latter being connected to an electric source 14 through the sensor 11 and a high-speed, normally closed holding switch 13. The valve 12 is normally pushed toward the right-hand side by the action of a spring 12b so as to close the earlier-mentioned flow passage 22, but at this time a drain port 15 is opened by the movement of the valve 12, the port being connected to the oil-pressure chamber 10.

The arrangement described so far is not particularly different from the earlier proposed structures, and therefore the arrangement involves certain dangers, as explained before. When the vehicle runs at a high speed, the shift valve 5 being in its left-hand, high-speed position, if the sensor 11 accidentally generates a signal, the valve 12 would be unnecessarily opened, thereby changing over the valve 5 to the low-speed, right-hand side, which would suddenly brake the engine.

The present invention is to remove such defects. The chamber 10 is made to communicate with the low-speed clutch 2 through a by-pass 16, and the passage 22 has therein a restrictor or throttle 17, while the clutch 2 itself is provided with a leak valve, preferably of the centrifugal type, or a similar device, that is opened when the clutch 2 should rotate at a speed higher than has been predetermined, for discharging pressurized oil from the oil pressure chamber 2a.

With this novel arrangement, the leak valve 18 is opened during high-speed running to the vehicle or engine, so that even if an erroneous or faulty signal is generated by the speed-change sensor 11, and thereby the pilot valve is opened, resulting in oil being supplied from the circuit 8 to the chamber 10 through the passage 22, this oil would then be discharged by the valve 18 through the chamber 2a from the by-pass 16.

Consequently, there would be no faulty or undesirable increase in the oil pressure in the chamber 10, so that the shift valve 5 can remain in its initial high-speed position without being moved to the right, and the low-speed clutch remains in its inoperative condition, so that there will be no engine trouble on account of sudden braking.

With this safety operation, the restrictor 17 interposed in the passage 22 serves as a resistance to the passing of the pressurized oil, so that oil supply to the high-speed clutch 1 from the main line pressure circuit 8 can be maintained, keeping the clutch in its operative condition, thereby preventing any drawback, such as by the engine overrunning for lack of a load being applied thereto.

The invention additionally provides a subsidiary line pressure circuit 19 which is ordinarily connected to the low-speed clutch 2 through a second inlet opening 5d of the valve 5, provided on one side of the circuit 8 and being so arranged that, in place of the main line pressure circuit 8, the subsidiary circuit 19 can be brought into communication with the oil-pressure source 6 when the manual valve 7 is shifted to its "L" (low) position. In this mode of operation (schematically illustrated in FIG. 3), the low-speed clutch 2 is supplied with oil through the subsidiary circuit 19 so as to be kept in its operative condition.

Yet the above is not especially different from the earlier proposed arrangement of the inventor. The provision of the subsidiary line pressure circuit 19 may cause certain drawbacks. Namely, if the manual valve 7 is switched from the condition shown in FIG. 2 ("D", drive) to the "L" position of FIG. 3, for applying the oil to the subsidiary circuit 19, the oil would be supplied to the low-speed clutch 2 through the passage 4, and in the meanwhile considerable waste would result in that the oil flows from the passage 4 through the by-pass 16 to the chamber 10, and would be discharged to the outside through the drain port 15.

Consequently, the present invention provides further structural expedients to eliminate this additional drawback. A check valve 20 is interposed in the by-pass 16 to prevent such a reverse oil flow. The valve 20 may include, as a matter of example, a ball valve urged to its closing sides by a spring 20a. Additionally, if one assumes that, with this added arrangement, the pilot valve 12 is opened and the pressure within the main circuit 8 is supplied from the chamber 10 to the low-speed clutch 2 through the by-pass 16, and the passage 4, in order to obtain a certain pressure increase in the chamber 10, then the line pressure would partly flow in the reverse direction, namely to the subsidiary circuit 19, through the outlet opening 5b and the inlet opening 5d of the valve 5, and would then be discharged to the exterior through the manual valve 7 when the latter is in he "D" (drive) position. The result is that only an insufficient pressure increase can be obtained in the oil-pressure chamber 10.

The novel arrangement according to the invention is prepared for preventing this drawback as well. A check valve is interposed in the subsidiary circuit 19, which is closed by the pressure increase in the chamber 10, thereby to prevent the reverse oil flow. In further detail, the invention provides that the valve 21 includes a slidable valve member which is ordinarily so retracted as to open by the action of a spring 21a, and the flow passage 21c is connected to a chamber 21b provided on its rear, connected to the earlier-mentioned flow passage 22 through the valve 12, so that by opening of the latter, the line pressure may be supplied through it to the check valve 21.

Thus, according to the invention, the dangers of producing engine braking, or similar disturbances, owing to a faulty operation of the speed-change time sensor, or other elements of the hydraulic or electrical arrangement, can be successfully prevented. According to the second group of features of the invention, the drawbacks involved by the provision of the subsidiary line circuit are simply and completely eliminated.

The manually operable valve 7 is so constructed that the same may be changed over manually from the "N" (neutral) position (as shown in FIG. 1) to any one of the axially obtainable positions "R" (reverse), "P" (park), "D" (drive, shown in FIG. 2) or "L" (low, FIG. 3), as customary in most transmission systems, and identified in the figures by the respective capital letters. Automatic speed-change operation can be obtained, as explained above, when the valve 7 is set to the "D" position as shown in FIG. 2.

Those skilled in the art will no doubt understand how the oil passages or circuits, and particularly the main and the subsidiary circuits 8 and 19 are selectively interconnected to blocked when the valve 7 is moved from one low position to the other. To this end, the main circuit 8 has a branch that leads to the valve 7 at a point spaced apart from the original point of contact, and a similar pair of circuits can be seen in all figures, but mainly in FIG. 1 for the auxiliary or subsidiary circuit 19, namely for the selective connection of the oil-pressure chamber 2a of the high-speed system.

On the other, lower side of the movable valve portion 7, as shown, two other pairs of passages are shown, for cooperation with respective ones of the passages or circuits 8, 19, in conjunction with cut-outs and shorting passages in the valve itself, as illustrated. The low right-hand part of the manual valve system need not be identified by numerals because these particulars do not relate to the invention and are customary in transmission systems of this kind.

It should be understood that many modifications, additions and changes can be made in the described preferred, exemplary embodiment without departing from the spirit and scope of the invention. This application is closely related with the same inventors concurrently filed patent application Ser. No. 673,891, titled "Control Apparatus For Transmissions Of Motor Cars."

What we claim is:

1. An apparatus for preventing faulty operation in automatic transmission of motor cars, said transmission having a speed-change sensor and a shift valve therein, for controlling the operation of the latter, the apparatus comprising an oil-pressure operated high-speed clutch interposed in a high-speed system, and an oil-pressure operated low-speed clutch interposed in a low-speed system of said transmission, and means for interchangeably connecting said systems through said shift valve to a main line circuit that is connected to an oil-pressure source, wherein said shift valve is operable by the oil pressure, and has at one end an oil-pressure chamber connectable to said main circuit through a pilot valve that can be opened by operation of said sensor, and wherein said chamber is connected to said low-speed clutch through a by-pass, and a flow passage that connects said chamber to said main circuit has a restrictor interposed therein, while said low-speed clutch is provided with a leak valve that is opened when said low-speed clutch is operated at a speed higher than a predetermined value, for discharging the oil pressure from said low-speed clutch.

2. The apparatus as defined in claim 1, further comprising a manually operable valve interposed between said main line pressure circuit and said oil-pressure source, for selectively operating said oil-pressure control shift valve in one of a plurality of operational modes of said transmission, such as the usual "neutral," "reverse," "park," "drive" and "low" modes.

3. The apparatus as defined in claim 2, further comprising a subsidiary line pressure circuit ordinarily connected to said low-speed clutch, on one side of said main line pressure circuit, but selectively connectable instead to said oil-pressure source when said manually operable valve is located in a selected one of its operational positions, further comprising a first check valve interposed in said by-pass, and a second check valve interposed in said subsidiary circuit, the latter being closed when the pressure in said oil-pressure chamber is unduly increased.

* * * * *